June 22, 1971   S. E. KIVELA   3,585,719
POWER TOOLS

Filed Oct. 19, 1967   2 Sheets-Sheet 1

*Stanley E. Kivela*
INVENTOR.

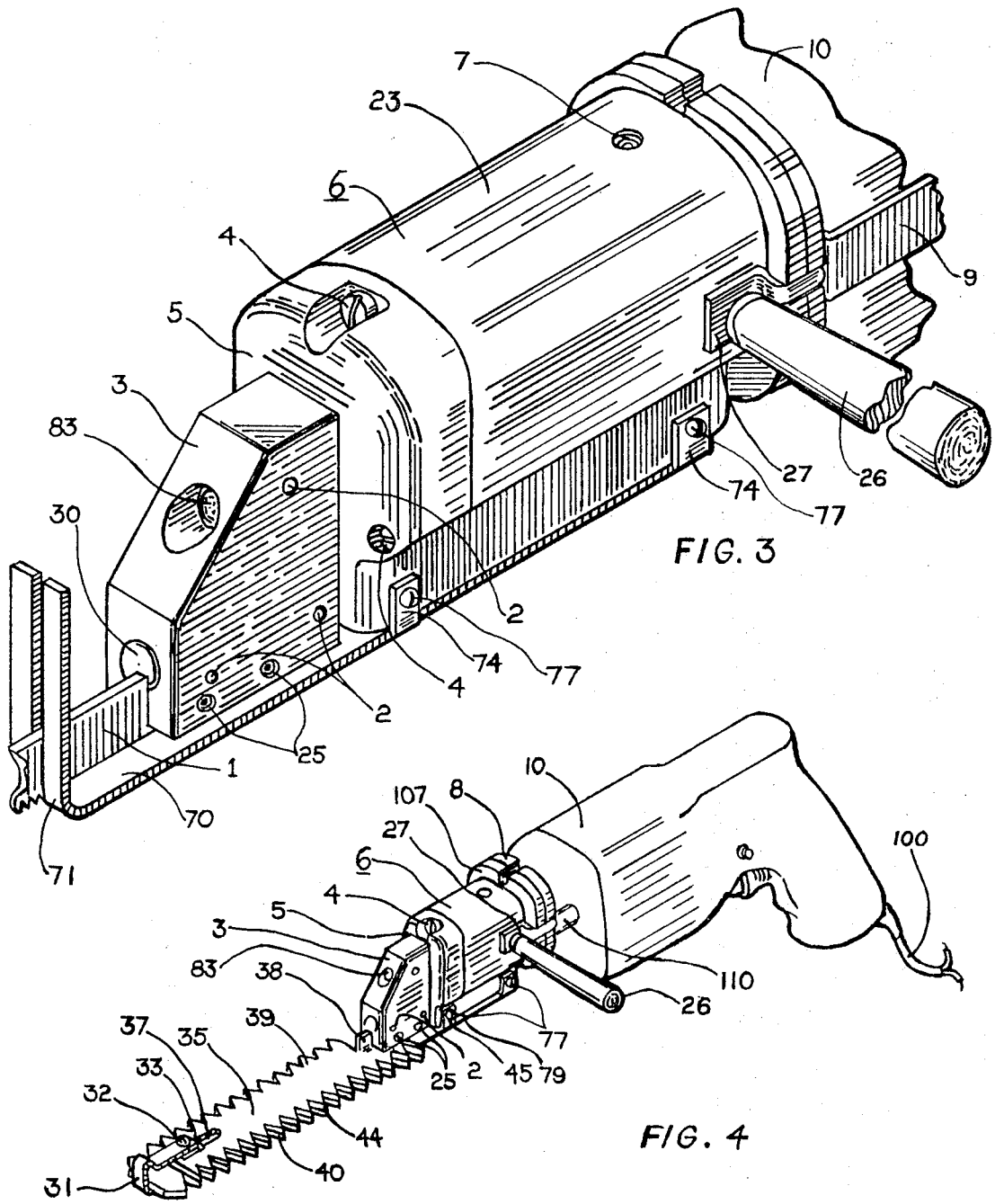

3,585,719
POWER TOOLS
Stanley Edward Kivela, Rte. 1, Box 94,
Marengo, Wis. 54855
Filed Oct. 19, 1967, Ser. No. 676,597
Int. Cl. B26b 19/02
U.S. Cl. 30—166
9 Claims

ABSTRACT OF THE DISCLOSURE

An attachment for power tools that have rotating powers shafts. The attachment converts the rotary motion of the power source into a reciprocating action. The tool holder that is part of the reciprocating component can hold a regular hacksaw blade or other cutting blades. This design also particularly lends itself to conversion into a grass trimmer by securing a serrated bed plate to the stationary housing of the attachment and a reciprocating serrated blade to the reciprocating tool holder. The entire attachment is rotatable 360° in relation to the power source and securable at 90° intervals. An "outrigger" stabilizing member prevents reciprocating tool holder from binding when any twisting forces are applied to the power tool.

BACKGROUND OF THE INVENTION

There are, as known to the applicant, a number of reciprocating saws such as those known as sabre saws and industrial types that are used by contractors such as plumbers for cutting rough in openings, by heating-ventilating men for cutting openings for registers, and by electricians.

References show a number of attachments with reciprocating means that are intended for securing to power tools. As shown and disclosed, most would require a special power tool for securing the attachment thereto with the front portion especially shaped to receive the attachment.

My invention is especially suited to securing to the usual configuration of portable electric drills as are on the market today. The anti-torque lock plate can be secured to the body housing of the tool in a number of ways. The attachment is threadably secured to the tool's usual threaded power shaft and abuts the mentioned lock plate. The tool can be rotated 360° in relation to the body housing of the tool. Numerous ways can be used to secure the attachment in fixed relationship to the body housing of the power tool.

This allows the user to maintain his usual comfortable and safe grip on the power tool and the attachment rotated and fixed in position according to the situation encountered.

SUMMARY OF INVENTION

The purpose of this invention is to provide an attachment with a reciprocating tool holder for an electric drill or power tool with a rotating power source. Portable electric drills such as are used for household and workshop purposes can be used with this invention. It can also be manufactured as an integral part of the power source.

The reciprocating tool holder can hold regular hacksaw blades, broken in half, and the free end ground and/or sharpened to suit, or special blades for various cutting purposes can be provided.

Another attachment for the reciprocating tool holder is a grass trimmer. A base plate with serrations is securable to the stationary portion of the attachment. A second blade with matching serrations is securable to the reciprocating tool holder. It is retained in firm contact with and on top of the base plate blade by a spring clip that creates a pressure upon the reciprocating blade. The reciprocating tool holder then causes the two blades with their respective serrations to create the usual and well known shearing cutting action as the serrations pass each other.

The basic attachment consists of an anti-torque and support lock plate that is adapted to fit on the exterior front housing of a power tool. This lock plate can be secured to the power tool housing as by a strap around the tool and attached to the lock plate at two points 180° apart. Another method is to provide adapter spacers and slightly longer counter sunk machine screws to secure the lock-support plate, through the spacers, and through the usual front gear case cover, to the body housing of the tools as is found in many types.

The attachment is then threaded onto the usual threaded stub power spindle with the rear of the attachment then in contact with and abutting the previously mentioned lock plate. A rotating power shaft in the attachment has an inclined "wobble plate" or ridge that is engageable with a reciprocating V block. This V block is operably secured to the tool holder. The previously mentioned attachment driven shaft is bored out for a distance rearwardly from its exterior end. Slideably engaged in this space is an "outrigger" stabilizer for the tool holder. This prevents any binding on the bearings and does not require any square reciprocating members, partial circle shafts and the like, to keep the tool holder fixed in relation to the housing of the attachment.

The entire attachment can be rotated 360° on the power shaft of the tool in relation to the lock-support plate and the body housing of the tool itself. Thus the most convenient relationship between the attachment and the tool can be selected and secured by means as shown or other methods, as by bolts, latch means, etc.

BRIEF DESCRIPTION OF THE DRAWINGS

FIG. 3.—This is a perspective of the attachment secured to a power tool.

FIG. 4.—This is a perspective of the attachment with the grass trimmer attachment for it secured thereto and the lock-support plate secured to the power tool with counter sunk machine screws and spacers replacing the regular ones as used in some drills to secure the front gear case housing to the drill's body housing.

Like numerals refer to like parts in the various views.

DETAILED DESCRIPTION OF THE INVENTION

For descriptive purposes we shall have, as illustrated, this invention operably secured to a portable electric drill.

Figure 1:
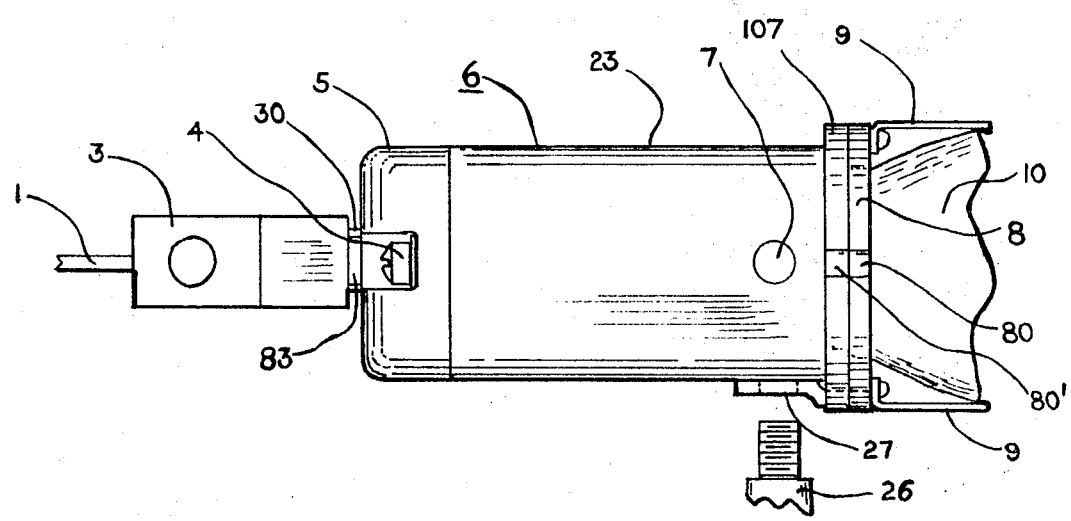
FIG. 1.—This is a top view of the attachment secured to a power tool with a retaining strap securing the lock-support plate to the tool. The well known bolt-clamp method is used to tighten the strap (not shown).

Referring to FIG. 1 which is a top view of the attachment 6 with a rear housing 23 and a baseplate disc 107. The body housing of the electric drill 10 is shown in partial view. The anti-torque/support/lock plate 8 is centrally cut out to fit over the exterior bearing boss of the drill 10. It is a snug fit over the front bearing boss of the drill. It is further secured by a strap 9 that wraps around the rear of the drill. It is tightened by the usual bolt-clamp method (not illustrated).

The attachment 6 is externally comprised of the rear plate 107 secured to rear housing 23 by counter sunk machine screws (not shown) and a removable front portion 5 secured to 23 by machine screws 4 (see also, FIG. 3). Projecting out of the front portion of 5 is a reciprocating shaft 30 and outrigger stabilizer shaft 83, total holder 3 and cutting blade 1.

Figure 2:
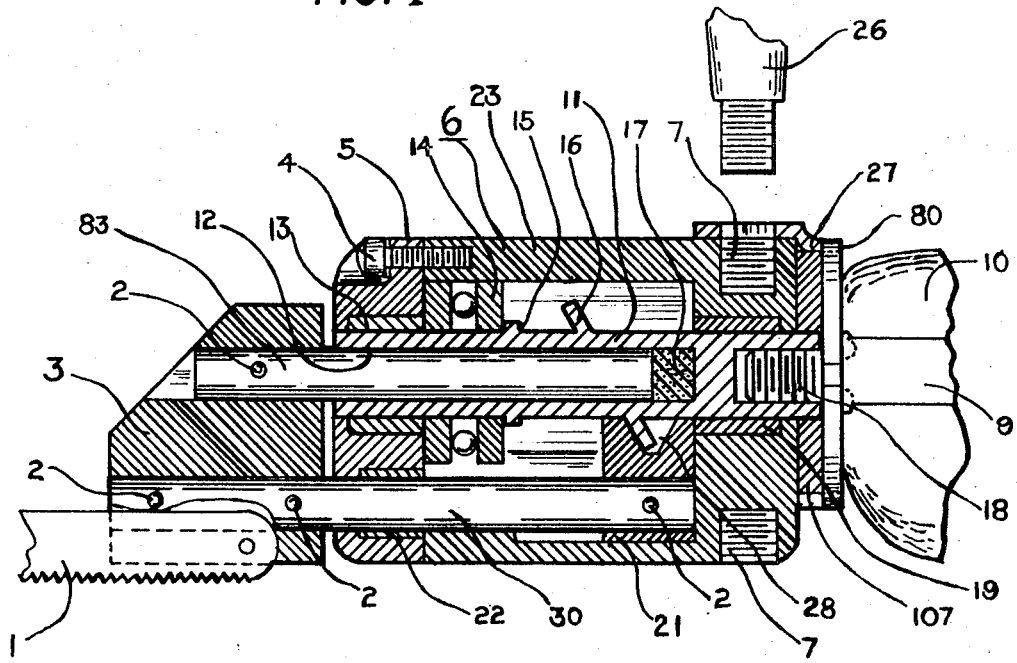
FIG. 2.—This is a cross section view showing the various internal parts and the reciprocating tool holder and its stabilizing member that is slidingly engageable with the main driven shaft of the attachment.

Anti-torque lock-support plate 8 has cut into it, at 90° intervals, notches 80. There are corresponding notches 80' in rear base plate 107. In FIG. 1 a threaded hole 7 (one of four at 90° intervals) for handle 26 is shown. Lock clip 27 is shown as it will fit into notches 80 and 80' at the side and be secured and tightened down by handle 26 with threaded end that is engageable into hole 7. Referring mainly to FIG. 2 and also FIGS. 1 and 3 it shows FIG. 2 as a cross section view of the interior working parts of the invention. This shows the threaded rotating power spindle 18 projecting from the front of drill 10. Driven shaft 11 of the attachment is threadably engaged to the threaded spindle 18. This driven shaft 11 is bored longitudinally 12 from its exterior end rearwardly toward the tool 10. Driven shaft 11 has an inclined ridge 16 that is rotatably engaged in V slot 28 of reciprocating member 21. This ridge 16 is inclined in relation to the longitudinal axis of shaft 11 causing 21 to reciprocate when shaft 11 rotates.

Driven shaft 11 also has a ridge 15 at right angles to its axis that bears against thrust bearing 14 that abuts the interior end of front portion 5. Power shaft 11 rotates in rear bearing 19 and front bearing 12. This thrust bearing 14 along with the usual thrust bearing in tool 10 provides thrust bearings for reaction forces acting both ways during reciprocation of the tool holder.

V slot member 21 is bored through and is secured to a reciprocating rod 30 by pin 2. As is evident by the illustration member 21 could also be a flat piece of metal fitted into an end slot of rod 30. This rod 30 reciprocates in bearing 21 and in passageway formed within the lower walls of housing 23. If member 21 was a flat piece of metal, a groove in the lower floor of housing 23 could be provided for it as a passageway.

A reciprocating tool holder 3 is slotted on its bottom surface to receive a blade 1. Set screws 25 retain blade in position (FIG. 3). Reciprocating tool holder is bored through to receive rod 30 and outrigger rod 83. It is secured thereon by pins 2. Lower rod 30 is also slotted partially to receive blade 1.

A unique feature of this invention is the method of stabilizing the tool holder. Outrigger stabilizer rod 83 is slideably engaged in counter bore 12 or driven shaft 11. A saturated piece of foam rubber or foam plastic 17 is provided. The alternate compression and release of this oil saturated material provides the lubrication for shaft 83. This shaft can also be square so it will frictionally bear in counter bore 12 only at its corners.

Thus when shaft 11 rotates, the inclined ridge 16 engaged in V slot member 21 that is secured to rod 30 and in turn to tool holder 3 causes the tool holder 3 to reciprocate back and forth. The outrigger member 83 slides in bore 12 keeping tool holder 3 fixed in relation to attachment 6. Member 21 is confined in its motion by the walls of the lower narrower portion of housing 23, shown best in FIG. 3.

FIG. 2 also shows lock clip 27 as it would be when secured to the top hole 7 of attachment's rear housing 23 by handle 26. When handle 26 is not needed a round head machine screw can be used instead for the purpose of holding down clip 27 onto housing 23 and into notches 80 and 80'.

The bottom cutting line of blade 1 is below the exterior lines of attachment 6.

Referring to FIG. 3 which is a perspective view of the invention. The previously described exterior parts are shown with some being more evident in their application and relation to each other. Lock clip 27 is shown with handle 26 and keeping notches 80 and 80' in registry with each other.

A cutting guard 70 is shown with bent up portion 71 at the exterior limits of the reciprocating stroke of tool holder 3. It has bent up tabs 74 and is secured to the bottom of housing 23 with round head machine screws 77.

Referring to FIG. 4, this is a perspective of the invention with a grass trimmer secured thereto. The reciprocating tool holder 3 performs as before. Secured into its blade notch is a bent up portion 38 of reciprocating blade 35. Set screws 25 secure it to the tool holder as like a cutting blade. Blade 35 has serrations 39 on its two exterior sides and a longitudinal slot 37 at its end. A stationary bed plate 40 with serrations 44 is secured to the bottom of housing 23 by bent up tab 45 and screws 77.

The reciprocating blade 35 is maintained in firm contact with bed plate 40 by a spring clip 31 that is secured by bolt 32 through the top of clip 31 through the slot 37 of top blade 35 and through a hole (not shown) in bed plate 40. When tool holder 3 reciprocates the serrations 39 and 44 coact to create the usual well known cutting action. FIG. 4 also shows another method of securing anti-torque/support plate to drill 10.

In this type of drill, the usual machine screws securing the front gear case cover to the drill body housing are removed.

They are replaced by longer flat head, counter sunk screws through counter sunk holes in lock/support plate 8, through spacers 110, and into the threaded holes in the drill body housing.

It should be understood that the front housing of the drill 10 can be manufactured to incorporate the anti-torque lock/support plate as an integral part of the front of the drill itself.

A more convenient way of using the grass trimmer attachment is to rotate and secure the attachment either 90° left or right from what is shown in FIG. 4.

Further, various modifications might be resorted to by those skilled in the art and it is not desired to limit this invention to the exact form as disclosed herein in this application and all such modifications are intended to fall within the spirit and scope of this invention as claimed.

What is claimed as new is:

1. In an attachment for a power tool that has a rotating power shaft with a housing containing means to convert the rotating motion of said shaft into a reciprocating motion along with a reciprocating tool holder wherein the improvemet comprises an attachment that has a housing with a driven shaft longitudinally and operably disposed therein with one end of said shaft operably securable to the rotating driving shaft of a power tool with the opposite end of said driven shaft bored out longitudinally for a distance inwardly and at a distance from driven end of said driven shaft, an inclined ridge that is inclined in relation to the longitudinal axis of said driven shaft and operably part of said driven shaft with said ridge rotably engaged within an essentially V shaped slot of a reciprocating member causing it to reciprocate when said driven shaft is rotated and said member reciprocating at a distance from and in an essentially parallel plane to the longitudinal axis of said rotating driven shaft, and operably secured to said reciprocating V slotted member, a tool holding means at the exterior of said housing and operably part of said tool holder, a structural member projecting rearwardly therefrom and slidingly engageable within said bored out portion of said driven shaft thus providing a stabilizing and reinforcing member for said tool holder and maintaing it in a fixed relationship axially to said housing of said attachment.

2. The invention of claim 1 wherein said rotating driven shaft of said attachment has, within the interior of said housing, a thrust receiving ridge operably part of said driven shaft and projecting outwardly therefrom, with the rotating plane of said ridge constantly perpendicular to the longitudinal rotational axis of said driven shaft, said ridge being at a distance from the interior forward wall of said housing, a thrust bearing interposed, on said driven shaft, between said ridge and said wall, the exterior of said thrust bearing in contact with said ridge and said wall and said thrust bearing co-acting with the usual thrust bearing within said power tool thus providing thrust bearings for reaction forces during both forward and back movements of said reciprocating parts.

3. The invention of claim 1 wherein at the interior end of said bored out portion of said driven shaft, is reposed a quantity of compressible lubricant saturated material, for the purpose of providing lubrication for said structural member that is slidingly engaged within said bored out portion of said driven shaft with said material being partially compressed at the rearward movement of said structural member.

4. The invention of claim 1 wherein at least a portion of the rear surface of said housing of said attachment is a flat surface with its plane perpendicular to the longitudinal axis of said driven shaft with said flat surface of said housing adapted to be in contact with a co-action flat surface on said power tool providing support means for any deflection forces applied to said attachment in use of said attachment.

5. The invention of claim 1 wherein at a distance inwardly from the end of said attachment from the end which is adjacent to said power tool and disposed on the surface of said attachment are a plurality of threaded recesses with the plane formed by said tapped recesses perpendicular to the longitudinal axis of said attachment and with handle means with a threaded end, threadably secured in one of said recesses.

6. The invention of claim 1, including a grass or foliage cutting attachment comprising a stationary serrated base plate secured to the stationary housing of said attachment, a movable plate with serrations that are in registry with serrations of said base plate, said movable plate operably secured to said tool holder with said movable plate being in firm contact with the surface of said stationary plate by an essentially U shaped spring clip operably secured over the end of the said two serrated plates with a portion of end of said clip creating a resilient spring force, keeping the said movable plate in firm sliding contact with said base plate and said reciprocating tool holder providing the motion for cutting action between the serrations of said base plate and serrations of said movable plate.

7. The invention of claim 1 wherein said reciprocating member with essentially V shaped slot is confined within its reciprocating path by a portion of the interior walls and interior bottom wall of the said housing of said attachment, said confinement providing a longitudinal passageway for the reciprocation of said member.

8. The invention of claim 1 wherein the tool holder is comprised of a structure with a lower surface that is in the same plane of reciprocation as the internal parts of said attachment and projecting rearwardly from said tool holder said structural member and a lower tool holder carrying member with the lower member secured to said reciprocating member with said essentially V shaped slot and with said stabilizing member slidingly engageable within the bored out portion of said driven shaft providing a reinforcing, stabilizing function for said tool holder keeping said tool holder in fixed relation axially to said housing of said attachment.

9. The invention of claim 1 wherein the exterior tool holding means comprises a member operably secured to said interior reciprocating member with said rearward projecting reinforcing member slidingly engageable within said rotating driven member, with the bottom surface of said tool holder essentially parallel to the longitudinal axis of said driven shaft with said bottom surface slotted to receive a cutting blade, retaining set screw means retaining said blade in said slot, with the cutting line of said blade exterior of a line projected forward from the bottom edge of said housing of said attachment.

References Cited
UNITED STATES PATENTS

| | | | |
|---|---|---|---|
| 2,463,387 | 3/1949 | Hoover | 74—56X |
| 1,679,884 | 8/1928 | Thomas | 74—60 |
| 1,898,956 | 2/1933 | Harvie | 30—272X |
| 2,240,755 | 5/1941 | Briggs | 30—272X |
| 2,824,455 | 2/1958 | Ristow | 74—60 |

MILTON KAUFMAN, Primary Examiner

U.S. Cl. X.R.

74—50; 143—68